United States Patent [19]

Marcault

[11] 4,230,271
[45] Oct. 28, 1980

[54] APPARATUS FOR DEPOSITING A UNIFORM THICKNESS LAYER OF PARTICULATE MATERIAL

[75] Inventor: Jeannik Marcault, Colombes, France

[73] Assignee: Saint-Gobain Industries, Neuilly-sur-Seine, France

[21] Appl. No.: 43,655

[22] Filed: May 30, 1979

[30] Foreign Application Priority Data

May 31, 1978 [FR] France ............................. 78 16272

[51] Int. Cl.³ .......................... B05B 7/14; B05B 15/02
[52] U.S. Cl. .................................... 239/113; 118/308; 239/143; 239/590; 239/597
[58] Field of Search ............... 239/112, 113, 143, 590, 239/597; 118/308, 312, 24, 25, 300

[56] References Cited

U.S. PATENT DOCUMENTS

| | | | |
|---|---|---|---|
| 3,453,134 | 7/1969 | Haw | 118/DIG. 5 |
| 3,458,133 | 7/1969 | Wiggins | 239/112 |
| 3,473,510 | 10/1969 | Sheng | 118/719 |
| 3,951,100 | 4/1976 | Sopko et al. | 118/729 |

*Primary Examiner*—Morris Kaplan
*Attorney, Agent, or Firm*—Pennie & Edmonds

[57] ABSTRACT

Apparatus for evenly and uniformly depositing particulate suspended in a gas on at least one surface, and in at least one direction, of a substrate. The apparatus has an exit slit (13) and a passage for communication of product including a main conduit (1), a plurality of secondary conduits (2) which are of equal length and internal diameter and a primary slit (6) communicating with a chamber (7). The slits are coextensive in length and the secondary conduits, of equal length, connect along the primary slit at regular spacing so that product is delivered uniformly to said exit slit.

10 Claims, 2 Drawing Figures

APPARATUS FOR DEPOSITING A UNIFORM THICKNESS LAYER OF PARTICULATE MATERIAL

DESCRIPTION

Technical Field

Apparatus providing a conduit including an inlet for a particulate material, a plurality of secondary conduits, and a chamber within which the particulate material entrained in a carrier gas through the inlet and secondary conduits is uniformly distributed in suspension, and an exit slit for receipt of particulate material and deposit in a uniform thickness layer on a substrate. The apparatus has application in the overall process of fabrication of semi-reflective glass through deposit of the salt of a metal on at least one surface of the glass and subsequent pyrolysis of the salt.

BACKGROUND ART

It is known to distribute material, such as a product whose consistency is substantially pulverulent and at most particulate of very small mesh size (less than about 25 microns), on a substrate in a regular, continuous or batch process. For example, in certain techniques, distribution of product on a substrate has been carried out manually and there are known spray devices for similarly distributing a layer of product. The ultimate fabricated item oftentimes requires that the distribution of product be carried out with precision, such that the deposited product, applied by projection or otherwise, have perfect regularity. For example, in the fabrication of semi-reflective glass through an overall manufacturing process including the pyrolysis of a metal salt on the surface of the glass, the metal salt providing the reflective capability need be distributed not only in a thin, but also in a regular layer on that surface. Otherwise, the glass which is intended to reflect at least a portion of the visible or infrared spectrum may fail in its capability of transmission or reflection, or it may exhibit striations or some other irregular feature on or across the surface of the glass.

The aforementioned spray devices, such as a device for spraying a layer of powdered paint, while capable of that stated application, for reason that variations in thickness of the material normally do not detract from the aesthetic appearance finally achieved, could not be used in the present fabrication procedure. Thus, with conventional spray devices employing a circular dispensing orifice or nozzle to aspirate the product by pneumatic evacuation means it is difficult, if not impossible, to deposit a layer of product having constant thickness throughout either the substrate or the area covered by the nozzle. This is because all portions of product projected through the nozzle do not take a single path, but rather a multitude of paths at various angles of inclination relative to the axis of the nozzle. Also, portions of the product move at different speeds in passing to the substrate. Thus, the thickness of the layer varies as the distance from the axis of the nozzle varies.

If a substrate having a large surface area required coating with a layer of product having a constant thickness, quite commonly several spray devices would be resorted to. However, a further problem or difficulty results in the use of a plurality of spray devices, namely that of the overlapping of layers of product from different nozzles. This problem or difficulty has also been found to result from the use of a single spray device, reciprocated back and forth over the surface area of the substrate. Further, the apparatus to provide movement of the spray device may suffer from mechanical problems of wear, and so forth, resulting in downtime in the fabrication process.

It has also been proposed to utilize an apparatus having an exit slit through which product is dispensed. In this apparatus, product in suspension in a gas is communicated to the exit slit by a conduit located generally centrally of the extremes of the exit slit. It has been found difficult, however, to obtain an even, uniform delivery of product over the length of the exit slit and it has been found that the delivery of product in greatest amount has occurred most often within the median portion of the exit slit. Not only does the product move from the exit slit to provide an unequal distribution on the substrate throughout the area of the exit slit, the apparatus is subject, also, to considerable load loss, so that the flow of product is not uniform along the exit slit.

DISCLOSURE OF THE INVENTION

The present invention is in an apparatus which overcomes the problems and disadvantages of the prior art and others not noted above thereby to dispense product substantially evenly and uniformly from the area of an elongated exit slit.

In the practice of the invention, product is supplied to the exit slit through a supply conduit and a chamber in suspension in a gaseous flow. The supply conduit for this purpose and capable of supplying product in this fashion includes a main supply line and a plurality of secondary lines subdivided therefrom. Each secondary line is of the same length, including a conducting path having the same internal cross-sectional area, and each secondary line connects the supply line and chamber at equally spaced locations therealong.

Because each secondary line is of the same length and of the same cross-sectional area, they are subject to the same or similar load loss and, consequently, each secondary line will convey product to the chamber at the same rate of delivery. Since the secondary lines are equally spaced along the chamber, distribution is substantially uniform at the entrance to the chamber and at the exit slit which is coextensive therewith.

In a more specific form, the apparatus includes a sub-chamber communicating with the chamber. The sub-chamber includes a restriction having the profile of a Venturi. It has been found that the restriction which extends along the sub-chamber improves the homogeneity of distribution of product entering into the chamber. Provision of a further pair of openings entering into the chamber positioned laterally and on opposite sides the sub-chamber provide further enhancement of the homogeneity of distribution of product in the chamber. These openings are in the form of slits which extend parallel to the opening along the restriction for communication of gas at a greater delivery rate and under pressure greater than that of the gas within which product is entrained for conveyance to the chamber. If the characteristics of both lateral flows are the same, then the further enhancement or perfection of homogeneity of the product will result through a dilution of the gas flow or primary flow carrying product as the gas gradually expands into the chamber.

The lateral flows, also, serve to provide a wiping action thereby to prevent or reduce the accumulation of product on the walls of the chamber.

As an aspect of the present invention, each lateral flow of gas communicates with the chamber through a slit, having first flowed through a plurality of conduits including separate baffles and orifices connecting with the supply of gas. This structure comprises a multiple load loss unit which enhances the capability of dilution of the primary flow and homogeneity of product moving to the exit slit.

As a further aspect of the present invention, an auxiliary flow line may be provided within the chamber for introduction of a further fluid upstream of the exit slit.

Other aspects and advantages of the present invention may become apparent as the description to be considered with the accompanying drawing continues.

BEST MODE FOR CARRYING OUT THE INVENTION

The apparatus of the present invention, as seen in the Figures and, more particularly described below, functions to distribute material both evenly and uniformly from an exit slit outlet onto the surface of a substrate. The substrate may be a sheet or strip of glass (hereinafter "glass"), preferably transparent in character, having a width of several meters.

The apparatus includes a conduit 1 which may be considered the main conduit for delivery of product entrained in or suspended by a gas flow. The product may be a metal salt, such as tin oxide, or a powdered or finely particulate paint or enamel material, for example. If the product is particulate in nature, the particles will have a size of no more than, and preferably less than, about 25 microns. The gas may be air or other gas inert to the product which is entrained or suspended therein. Air is preferred for many reasons, including cost and availability.

Conduit 1 is subdivided into a plurality of secondary conduits 2, connecting at each of several locations 3 along a chamber 4. Each of the secondary conduits are of equal length and provide an equal cross-sectional internal flow path. The several locations are at equal or regular intervals along the chamber, which may be characterized as a "sub-chamber".

Figure 2:
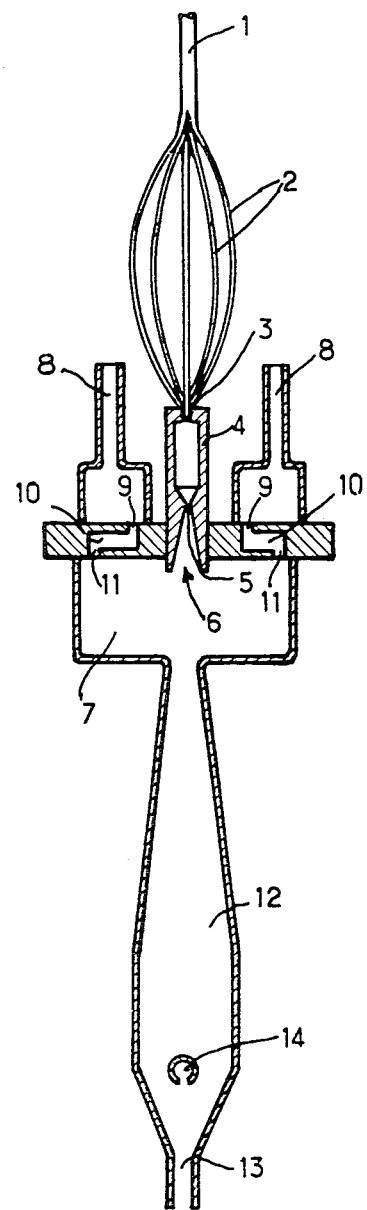
FIG. 2 is a view in section as seen along the line II—II in FIG. 1.
Figure 1:
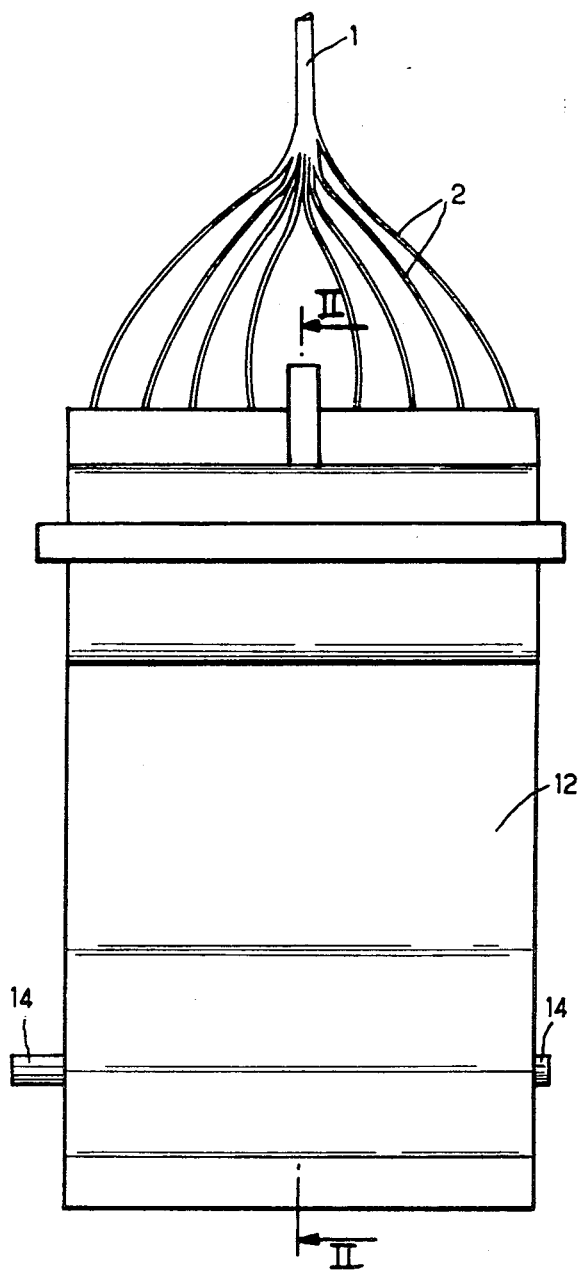
FIG. 1 is a view in elevation of the apparatus of the present invention.

As may be seen in FIG. 2, the sub-chamber 4 communicates with a chamber 7 which may be characterized as a "primary chamber". This communication is through a restriction 5. As may be seen in FIG. 1, the chambers are coextensive and the restriction which may be likened to a Venturi, likewise, is coextensive with the chambers. The flow of gas with the entrained or suspended product moving toward primary chamber 7 expands within a slit 6 opening outward along the restriction.

The primary chamber 7 serves as a chamber within which product is evenly and uniformly dispersed for movement to a location at which it is dispensed onto the substrate. Even and uniform dispersion of product will be enhanced by virtue of the sub-chamber 4 receiving substantially identical yields from each of the secondary conduits, and the expansion of the gas/product flow into the primary chamber 7. These substantially identical yields derive from each secondary conduit because the load loss in each is substantially identical, as previously discussed.

A further pair of conduits 8 are provided thereby to provide an additional gas supply to primary chamber 7. As may be seen in the Figures, each conduit communicates with a chamber and, through a plurality of orifices 9, a recess 10. The recesses preferably include a plurality of baffles (not shown) and the gas exits to primary chamber 7 from a pair of slits 11. The baffles, orifices and the slit of each additional flow path serve as load loss structure and gas under pressure is delivered uniformly to the primary chamber 7. The slits 11 are located on opposite sides of slit 6, and are both parallel to and coextensive with slit 6. Gas from slits 11 serve to dilute the gas/product flow entering primary chamber 7 and both evenly and uniformly disperse the product throughout the area of the primary chamber. An even and uniform dispersion is enhanced by equally spacing each slit 11 from the slit 6. The slits, also, serve to provide a wiping action thereby to prevent accumulation of product on the walls of primary chamber 7. Wiping is the result of eddy currents within the region of the walls.

Preferably, the gas supplied at each slit 11 will be air, for reasons as previously set out, and at a pressure in excess of the pressure of gas at slit 6.

A passage 12 communicates the exit or distribution slit 13 and primary chamber 7. As may be seen to best advantage in FIG. 2, the passage includes a plurality of zones wherein, respectively, the passage diverges from a chamber outlet, is substantially constant in width and, then, converges toward the longitudinal exit slit comprising a pair of parallel, spaced-apart walls.

Each of slits 6, 11 (of both additional gas supplies) and 13 may be of a length of between about 250 and 650 mm.

A conduit 14 may be positioned upstream of the exit slit. The conduit may be supplied with one or more auxiliary gases which may be introduced to the gas/product flow through a plurality of openings directed toward the exit slit. Thus, the auxiliary gas may be communicated uniformly to the gas-product flow.

In the fabrication of semi-reflective glass, a metal salt is deposited by the apparatus described on the surface of the glass and the glass with its deposit is heated. The operation of the apparatus will be such that the deposit is defined by an even, uniform layer throughout the surface area of the glass. By juxtaposition of several apparatus or modules, a substrate, heretofore described as glass, having a width of several meters, may be treated.

According to one manner of operation, the glass may move relative to and crosswise of the exit slit at a speed of about 6 m/min. The flow of gas/product and gas may vary according to the type of product to be deposited and the dimensions of the exit slit. In one successful operation, the product is a metal salt, as discussed above, with a delivery flow rate to the primary chamber 7 from conduit 1 (gas/product) and additional conduits 8 (gas) of 1 m$^3$/h per cm of length of slit 6 and 4 m$^3$/h per cm of length of slit 11, respectively. The gas/product, accordingly, flows from the exit slit at a speed of about 7 m/sec to deposit both evenly and uniformly about 6 g/m$^2$ of chromium acetylacetonate.

According to another application of the apparatus of the present invention, similar modules may be deposited in pairs, in parallel, for deposit of layers of product both evenly and uniformly on the same surface of the glass moving crosswise to the exit slits of each pair of preferably at right angle with the flows of gas issuing from said slits. The deposited layers may be either the same or different products. In the fabrication of semi-reflective glass, one product may be of the type to reflect visible radiation, while the other product may reflect infrared radiation.

Further, in the fabrication process, a deposit on each of the two surfaces of the glass may be carried out, and either the same or different products may be deposited.

The homogeneity of the deposit, such as that of tin oxide, through use of the apparatus has been found excellent, and by movement of the glass relative to the exit slits, as described in the immediately preceeding application, it is possible to obtain glass which is perfectly monochromatic in the longitudinal and crosswise directions.

While, in the prior art, there oftentimes arise problems and difficulties incident to wear from movement of parts, the apparatus of the present invention is defined by a standing station which operates with great reliability.

While the invention has been described in connection with the preferred embodiments, it is not intended to limit the invention to the particular forms set forth above, but, on the contrary, it is intended to cover such alternatives, modifications, and equivalents as may be included within the spirit, and scope of the invention as defined by the appended claims.

I claim:

1. Apparatus for depositing in an even and uniform layer a particulate material on a substrate, said apparatus including
   (a) a housing including a longitudinal exit slit, and
   (b) means for moving said particulate as a gaseous suspension to said exit slit, said means including
      (1) a chamber in said housing,
      (2) a main conduit into which said suspension is received, and
      (3) a plurality of secondary conduits, dividing from one end of said main conduit, and each said secondary conduit being of equal length and internal diameter with the other end connected to said chamber within a length coextensive with said exit slit and at equally spaced intervals therealong.

2. The apparatus of claim 1 wherein said chamber is formed with a sub-chamber in the upstream direction with which said other ends connect, and a second slit connecting said sub-chamber with the remainder of said first recited chamber, said second, said slit being coextensive with said exit slit and having the profile of a Venturi passage.

3. The apparatus of claim 1 or 2 including means supplying an additional supply of gas, said supply means including a pair of side slits, said side slits communicating with said chamber, each of said side slits being parallel to each prior slit, and both equally spaced and coextensive with each prior slit, said side slits adapted to communicate a gas under pressure uniformly along their lengths to said chamber.

4. The apparatus of claim 3 wherein said housing includes both a divergent and a convergent portion upstream of said exit slit communicating said exit slit with said chamber.

5. The apparatus of claim 4 wherein said supply means includes an additional supply chamber communicating with each side slit, a plurality of orifices for passing said additional gas to said additional supply chambers, and a plurality of baffle conduits in each additional supply chamber.

6. The apparatus of claim 4 including auxiliary gas supply means for supply of at least one auxiliary gas to said chamber, said auxiliary gas supply means disposed within said divergent-convergent portion.

7. In combination, at least two apparatus adapted for depositing a particulate material in an even and uniform layer on a substrate, each said apparatus including
   (a) a housing including a longitudinal exit slit, and
   (b) means for moving said particulate as a gaseous suspension to said exit slit, said means including
      (1) a chamber in said housing,
      (2) a main conduit into which said suspension is recieved, and
      (3) a plurality of secondary conduits, dividing from one end of said main conduit, and each said secondary conduit being of equal length and internal diameter with the other end connected to said chamber within a length coextensive with said exit slit and at equally spaced intervals therealong, and wherein at least two of said apparatus are juxtaposed side-by-side whereby the overall length of said exit slit is equal to the summation of slit lengths.

8. In combination, at least two apparatus adapted for depositing a particulate material in an even and uniform layer on a substrate, each said apparatus including
   (a) a housing including a longitudinal exit slit, and
   (b) means for moving said particulate as a gaseous suspension to said exit slit, and means including
      (1) a chamber in said housing,
      (2) a main conduit in which said suspension is received, and
      (3) a plurality of secondary conduits, dividing from one end of said main conduit, and each said secondary conduit being of equal length and internal diameter with the other end connected to said chamber within a length coextensive with said exit slit and at equally spaced intervals therealong, and wherein at least one apparatus is disposed on one side of said substrate and at least one apparatus is disposed on the other side of said substrate for deposit of product on the opposite surfaces.

9. The combination of claim 8 wherein the apparatus on said one side and the other side include at least two apparatus juxtaposed in side-by-side relation whereby the overall length of said exit slit is equal to the summation of slit lengths.

10. The combination of claim 7 or 9 wherein further apparatus equal in number to said first-mentioned apparatus likewise are in juxtaposed side-by-side relation and disposed parallel thereto whereby different particulate materials may be deposited on the same surface of said substrate.

* * * * *